(12) United States Patent
Vogt

(10) Patent No.: US 6,484,133 B1
(45) Date of Patent: Nov. 19, 2002

(54) SENSOR RESPONSE RATE ACCELERATOR

(75) Inventor: Michael C. Vogt, Westmont, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 09/539,961

(22) Filed: Mar. 31, 2000

(51) Int. Cl.[7] ............................................. G06F 15/00
(52) U.S. Cl. ..................... 702/190; 702/189; 702/182; 324/340; 324/342; 340/855.6; 340/938; 340/549; 706/10; 706/18; 706/22
(58) Field of Search ................................ 702/190, 108, 702/117, 120; 324/340; 706/10, 12, 14–16, 18, 22, 23, 25–27

(56) References Cited

U.S. PATENT DOCUMENTS

| | | | |
|---|---|---|---|
| 5,371,413 A | * | 12/1994 | Strobach ..................... 326/104 |
| 5,629,872 A | | 5/1997 | Gross et al. |
| 5,675,713 A | | 10/1997 | Batten, Jr. |
| 5,745,382 A | | 4/1998 | Vilim et al. |
| 5,761,090 A | | 6/1998 | Gross et al. |
| 5,898,304 A | | 4/1999 | Mandl |
| 6,313,643 B1 | * | 11/2001 | Tirkel et al. ................. 324/642 |

OTHER PUBLICATIONS

Taveniku et al., A reconfigurable SIMD Computer for Artificial Neural Networks, Auegst 1994, Lulea University of Technology, pp 1, 55–71.*

* cited by examiner

*Primary Examiner*—Marc S. Hoff
*Assistant Examiner*—Elias Desta
(74) *Attorney, Agent, or Firm*—Foley & Lardner

(57) ABSTRACT

An apparatus and method for sensor signal prediction and for improving sensor signal response time, is disclosed. An adaptive filter or an artificial neural network is utilized to provide predictive sensor signal output and is further used to reduce sensor response time delay.

21 Claims, 4 Drawing Sheets

SENSOR RESPONSE RATE ACCELERATOR

STATEMENT REGARDING FEDERALLY SPONSORED RESEARCH OR DEVELOPMENT

The invention was made with U.S. Government support under contract no. W-31-109-ENG-38 awarded by the Department of Energy and the U.S. Government has certain rights in this invention.

FIELD OF THE INVENTION

The invention relates generally to the field of signal conditioning. More particularly, the invention relates to an interoperating collection of adaptive filters supporting sensor signal prediction and that prediction's application. The adaptive filter based sensor signal predictor(s) may be used to increase a sensor's rate of response.

BACKGROUND OF THE INVENTION

Many industrial control applications require a plurality of sensors. In some applications, the sensors have a response time that is inadequate to provide effective control of the system.

Sensor response time may be described as the period between changing physical conditions and a change in the sensor (electrical) output. Sensor sensitivity may be described as the amount of change necessary in the physical condition that is needed to initiate a similar change in the sensor output signal. Together, the response time and the sensitivity of the sensor control the output signal.

If a given sensor's response time is N (i.e., N=50 milliseconds) and its sensitivity is S (i.e., S=+/−10 parts per million, for a chemical sensor) then N milliseconds after an S part per million change is experienced, the sensor will produce an approximately proportional, measurable change in the generated electrical signal. A control system external to the sensor, relying on the sensor, receives no benefit in polling or sampling the sensor any faster than it can physically respond, because no change (or an inaccurate change) in the electrical signal will be detected. If, for example, the external control system requires a feedback signal at higher sampling frequencies than the frequency response of the sensor, the conventional or classic solution is to develop a new sensor with different (improved) physical response characteristics. Development of new sensors however, is costly and potentially not possible.

Therefore, there is a need for a method and apparatus for improving sensor response times by predicting sensor outputs. Further, there is a need for inexpensive electronic devices that serve as interfaces between a closed (black box) control system and a given (chemical, pressure, temperature, etc.) sensor. Further still, there is a need for sensor predicting devices that utilize adaptive filter or neural network prediction algorithms to monitor sensor short-range past response and are able to predict the short-range future response of the sensor. Further still, there is a need for sensor predicting devices utilizing adaptive filter or neural network prediction algorithms that employ adaptive error correction and optionally provide interpolated output in the short time period that is required by the external control system.

SUMMARY OF THE INVENTION

An exemplary embodiment of the invention relates to a system for improving the response time of a sensor. The sensor includes an input configured to sense an environmental characteristic and an output configured to provide an electrical signal representative of the input. The system also includes a sampling system configured to sample the sensor output at discrete time intervals and provide sampled sensor output signals. Further, the system includes an adaptive filter including a plurality of inputs and at least one output, the plurality of inputs configured to receive sampled sensor output signals, and at least one output of the adaptive filter configured to provide at least one estimated future sensor output based on the plurality of sampled sensor output signals provided to the plurality of inputs to the adaptive filter.

An exemplary embodiment of the invention also relates to a method of predicting the output of a sensor. The sensor has an input for sensing an environmental characteristic, and the sensor having a sampled output representative of the input at a discrete time interval. The method includes providing, to a plurality of inputs of an artificial neural network, a plurality of discrete sensor outputs. Each discrete sensor output is representative of a sensor input at a different discrete time interval. The method also includes generating at least one output of the artificial neural network. The at least one output being an estimate of at least one future sensor output.

Further, an exemplary embodiment of the invention relates to a method of predicting sensor output. The method includes adapting weights of an artificial neural network. The method also includes receiving, by the artificial neural network, a plurality of discrete sensor outputs from p discrete time intervals, up to the time n. Further, the method includes generating an output of the artificial neural network, based on the sensor outputs from the p discrete time intervals. The output is representative of the predicted sensor output at time n+1.

Further still, an exemplary embodiment of the invention relates to a method of accelerating the output of a sensor. The method includes receiving by a first neural network a plurality of sensor outputs at discrete evenly spaced time intervals less than and including time n. The method also includes receiving by a second neural network a plurality of sensor outputs at discrete evenly spaced time intervals less than and including time n+m, where 0<m<1. The method further includes generating, by the first neural network, a predicted sensor output that is an estimate of the sensor output at time n+1. Further, the method includes generating, by the second neural network, a predicted sensor output that is an estimate of the sensor output at time n+1+m.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF EXEMPLARY EMBODIMENTS

A method and apparatus configured to perform sensor predictions utilizing an adaptive filtering, such as an adaptive filter or an artificial neural network (ANN) is disclosed.

Artificial neural network (ANN) systems are somewhat unique from recognized heuristic algorithms and expert systems. Scientists pioneered artificial neural networks as a method of simulating human brain activity. Today, ANNs show great promise as computing devices and may receive great attention from scientists and engineers to solve problems that are traditionally problematic for machines, in particular, problems involving unknown nonlinearities. For example, ANNs are ideal for pattern recognition tasks, prediction tasks, and automatic control tasks. Most significantly, ANNs have the ability to "learn" specific tasks, and "adapt" to specific environments. An ANN learns by comparing its output to a known output. The ANN has a set of adjustable internal weight settings that may be adjusted to minimize the error between the ANN output and the known output. ANNs are similar to, related to, and in some cases the same as some adaptive filtering techniques. Thus, it should be noted that although one exemplary embodiment shown and described is an artificial neural network model, the disclosure is not limited to ANNs, but includes other adaptive filtering techniques, or methodologies.

Figure 1:
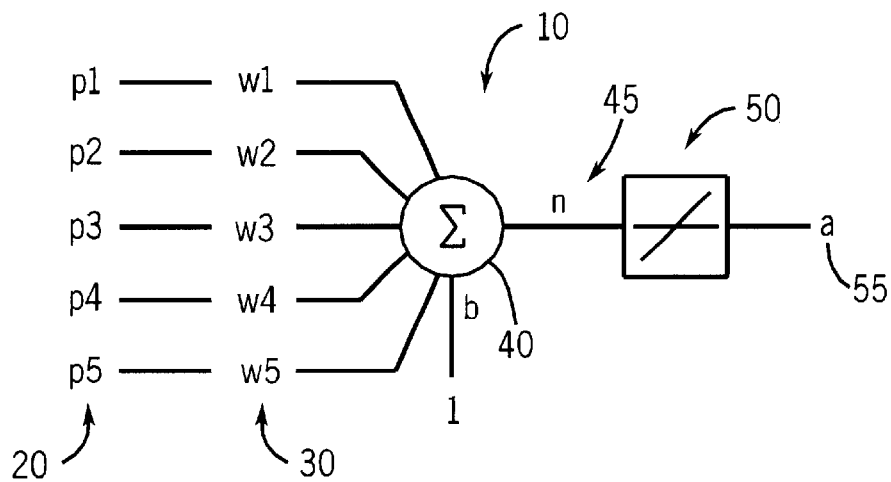
FIG. 1 is an exemplary block diagram of an artificial neuron model.

Referring now to FIG. 1, a single neuron ANN 10 is depicted. Exemplary ANN 10 includes a plurality of j inputs $(p_1, \ldots, p_j)$ 20. Each input $p_i$ 20 is multiplied by a weight $W_i$ 30 $(w_i=w_1, \ldots, w_j)$. The weighted inputs are added together at a summation stage 40, along with a bias b, to produce an output n 45, where $$n = \sum_{i=1}^{j} (P_i W_i) + b \tag{1}$$

In the exemplary embodiment of ANN 10, output n is passed through an activation stage or function 50 to produce an output a 55. Activation function 50 may be any of a variety of activation functions, including, but not limited to, a linear function, a logistic function, a hyperbolic tangent function, a discontinuous function, such as, but not limited to, the sign function, or other activation functions, squashing functions, sigmoidal functions, Gaussian functions, etc.

In a particular exemplary embodiment, ANN 10 includes an activation stage that is a linear function where $a=C_1 n+C_2$ such that $C_1$ and $C_2$ are constants, and is therefore known as an ADALINE (adaptive linear element) network such that $$a = C_1 \left( \sum_{i=1}^{j} (P_i W_i) + b \right) + C_2 \tag{2}$$

An ANN, such as ANN 10, or any of a variety of other ANNs or adaptive filters, such as, but not limited to, multi-layer perceptron networks, back propagation networks, radial basis function networks, adaptive linear filters, and the like, may be used to provide approximations of nonlinear functions or approximations between nonlinear associations between input and output.

In an exemplary embodiment, an ANN, such as ANN 10 may be used in a system to predict sensor output and/or improve sensor response time through sensor output prediction and estimation.

Figure 2:
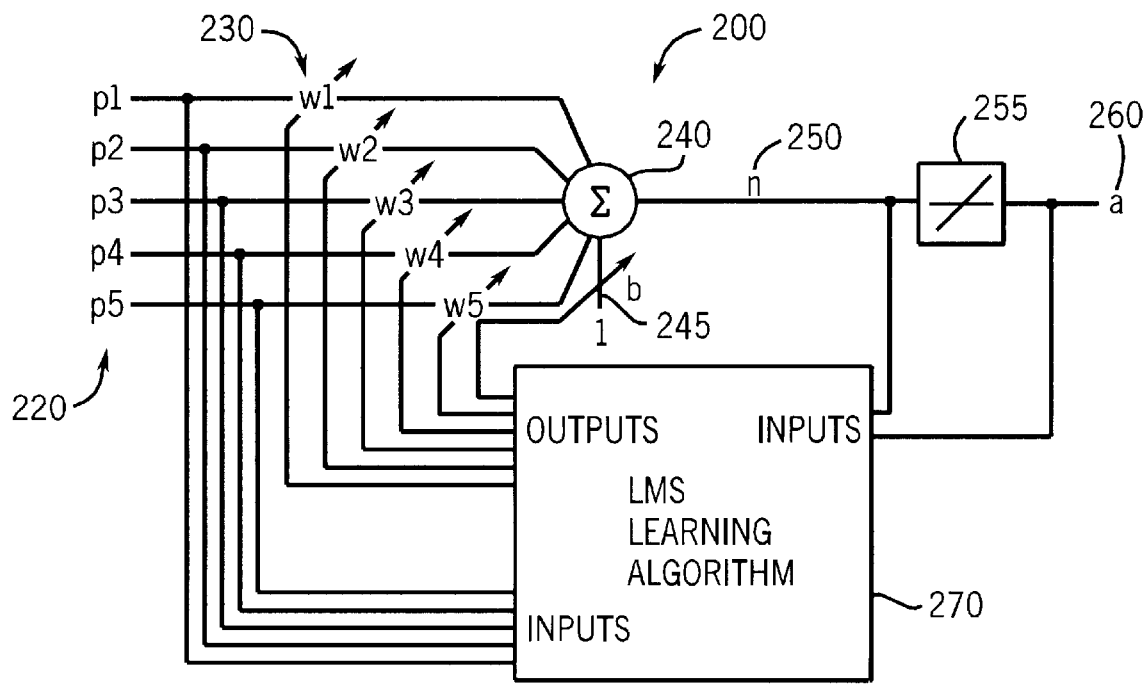
FIG. 2 is an exemplary block diagram of an artificial neuron model showing the feedback adaptation mechanism.

Referring now to FIG. 2, an exemplary artificial neural network 200 is depicted including an adaptive learning mechanism. Artificial neural network 200 receives inputs 220 $(p_1, p_2, \ldots, p_5)$. In an exemplary embodiment, $p_1$ may be the most recent sampled sensor input and $p_2, p_3, p_4$, and $p_5$, may be previously sampled inputs retrieved from a memory. Each of inputs 220 are multiplied by a set of weights 230 $(W_1, W_2, \ldots, W_5)$ respectively. Inputs 220, multiplied by weights 230, are summed at a summation stage 240 along with a bias b 245 to produce an output 250 n. Output 250 n is provided to activation stage 255 to provide a network output 260 a, each of inputs 220 and outputs 250 and 260 are provided as inputs to a least means squared (LMS) learning algorithm 270. LMS learning algorithm 270 calculates the error between the current sampled signal value $p_1$ and the previous iteration's predicted value a to adaptively correct the weight values $(W_1, W_2, \ldots, W_5)$. A particular exemplary learning law (algorithm) that may be applied is the Widrow-Hoff LMS error minimization method. The error is calculated as $$e=(a(n-1)-p_1(n)). \tag{3}$$

The weight values are then updated for the next iteration following the Widrow-Hoff rule $$W(n+1)=W(n)+2\alpha e(n)p^T(n), \ b(n+1)=b(n)+2\alpha e(n) \tag{4}$$

where $$p(n) = [\ p_1 \ \ p_2 \ \ p_3 \ \ p_4 \ \ p_5\ ], \tag{5}$$

$$W(n) = \begin{bmatrix} W_1 \\ W_2 \\ W_3 \\ W_4 \\ W_5 \end{bmatrix}, \tag{6}$$

and $0<\alpha<1$ is the learning rate. The error correction is completed each iteration and may be capable of achieving a small fraction of a percent error within a few iterations. This type of adaptively correcting algorithm may also be categorized as an adaptive filter that may be put into the framework of a neural network or provided as a software implemented algorithm.

Figure 4:
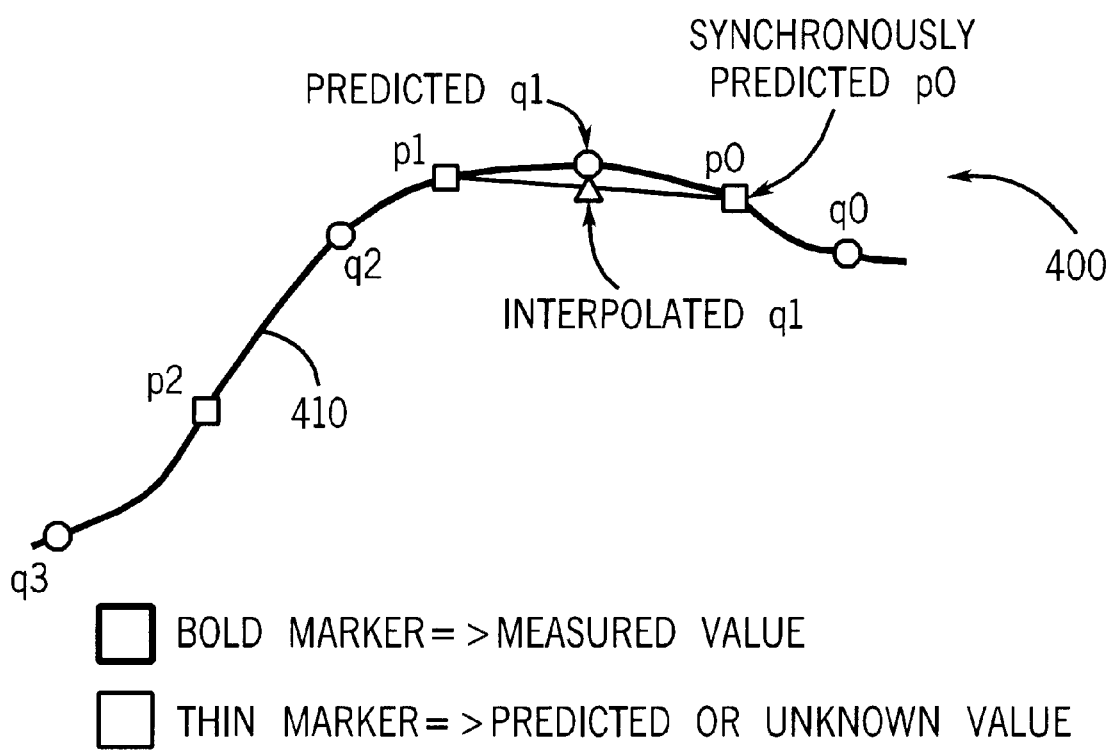
FIG. 4 is an illustration of an exemplary interpolation process used for improving sensor response time.

Referring now to FIG. 4, an exemplary graph 400 of a sensor output 410 is depicted. In one embodiment, a single ANN may be used to predict a sensor output one time increment into the future. For example, values $p_1, p_2$ and prior values of p may be used to predict the point $p_0$. Point $p_0$ may be exactly the same time step ahead of $p_1$ that $p_1$ is ahead of $p_2$. In order to predict a value prior to $p_0$, a prediction may be made for $p_0$ by the ANN and a separate value, between $p_1$ and $p_0$ may be established by interpolation. In FIG. 4, the interpolated point is designated as interpolated $q_1$. This may be suitable for high-speed operations where computational capability is limited but where small error introduced by the interpolation is acceptable. In the exemplary illustration of FIG. 4, a single value interpolated between $p_1$ and $p_0$ is shown, however, many values could be calculated using simple linear interpolation or other interpolation mechanisms, such as quadratic interpolation, hyperbolic interpolation, and the like.

In another exemplary embodiment, multiple ANNs may be used to eliminate the error introduced by the interpolation mechanism. The use of multiple predicting ANNs requires that the ANNs receive sensor input off-set in time and synchronized with one another. The examples shown and described herein show only two networks used to double an effective sensor response rate, but the number of neurons and the scaling/acceleration are limited only by processing power and A/D sampling speed.

Figure 6:
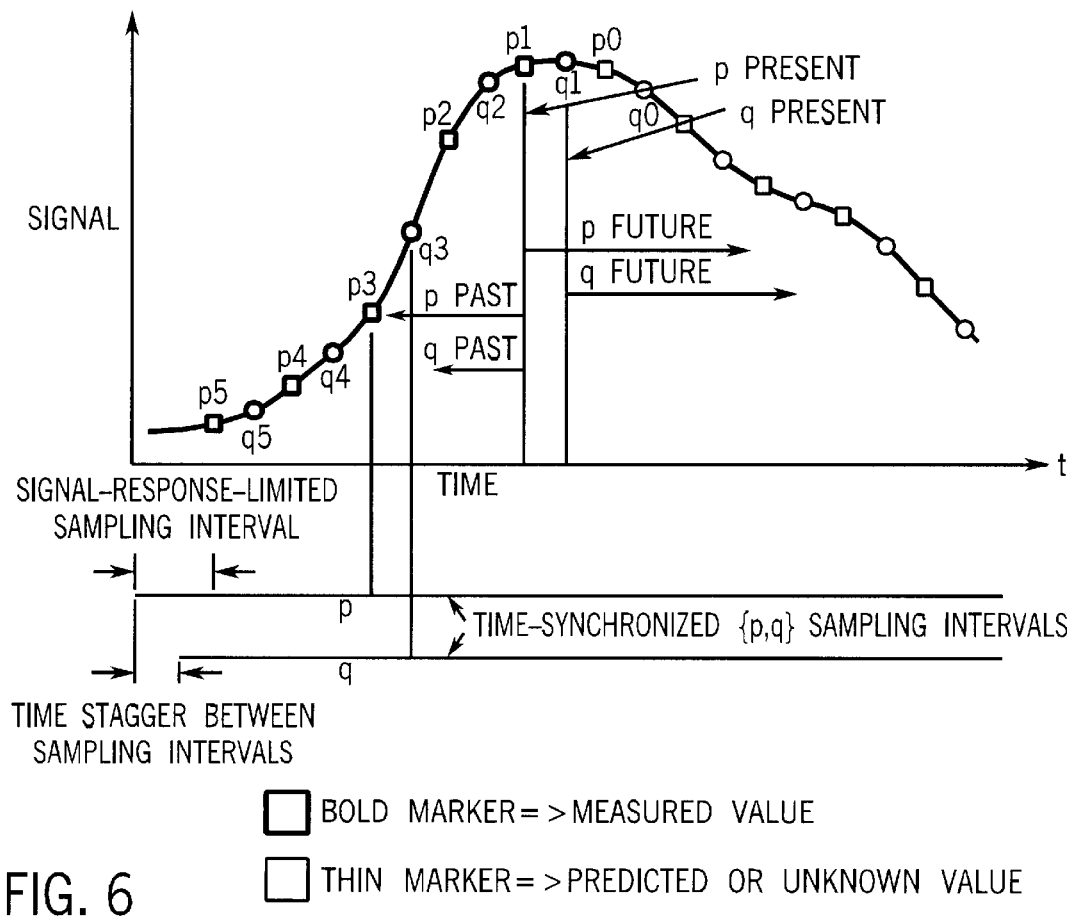
FIG. 6 is an illustration of a predicted sensor signal utilizing time off-set predictive filters.

Referring now to FIG. 6, sample values $p_1$ through $p_5$ may be used as inputs to the first neural network to predict the value of $p_0$. Off-set in time inputs $q_1$ through $q_5$ may be used to predict output $q_0$ in the future. The p and q values are off-set by a fixed amount controlled by the device, sampling rate, and the new $p_1$ and $q_1$ values are sampled independently with the same off-set.

Figure 3:
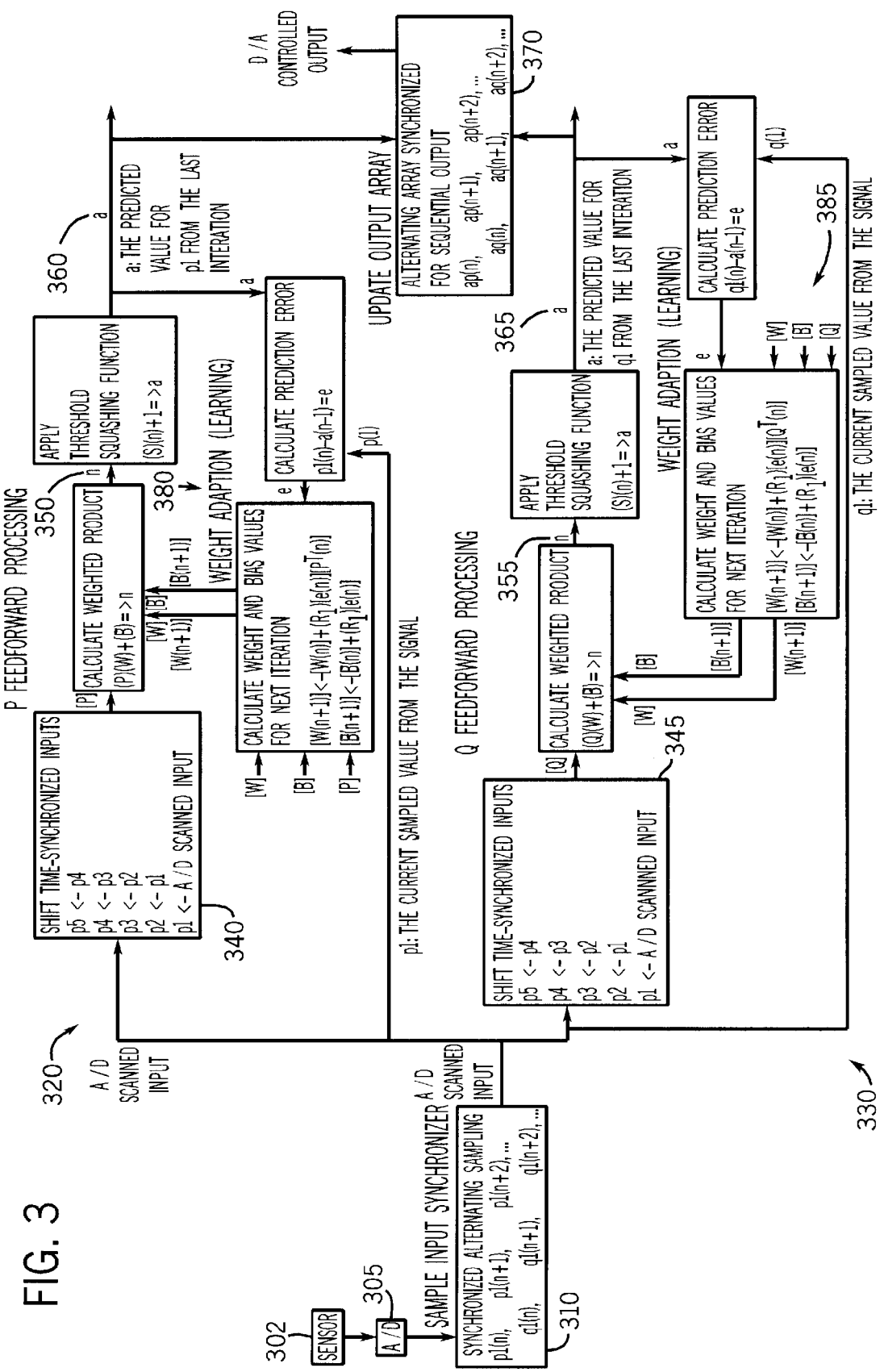
FIG. 3 is a block diagram of a sensor signal prediction system including two artificial neural networks.

Referring now to FIG. 3, a block diagram/flowchart depicts a system including two simultaneous executing networks predicting and accelerating the incoming signal by a factor of two. It should be noted that any number of networks may be applied in a similar manner as that illustrated in FIG. 3 which will increase the acceleration of the predicted sensor output. A sample input synchronizer 310 receives an incoming signal from an analog to digital (A/D) converter 305 which is coupled to an analog sensor 302. A/D converter 305 samples analog sensor 302 signal and provides the sampled output to sample input synchronizer 310. Sample input synchronizer 310 alternately copies to the p network 320 an input $p_1$ and then to the q network 330 an input $q_1$. The P network may normally be executed first to calculate $p_0$. Previous signals $p_1, \ldots, p_4$ are shifted in inputs by a shift time-synchronized inputs mechanism 340 and 345. For example, in shift time-synchronized inputs mechanism 340, $p_1$ is assigned the latest sampled input from sample input synchronizer 310, $p_2$ is assigned the previous value of $p_1$, $p_3$ is assigned the previous value of $p_2$, $p_4$ is assigned the previous value of $p_3$ and $p_5$ is assigned the previous value of $p_4$. The neural network processing takes place by calculating the weighted product n 355 and applying the threshold squashing function to produce the predicted output a 360 and 365. Outputs a are provided to a synchronized output controller module 370 which alternates in synchronized sequential output of the two networks. The alternating synchronized output may be supplied to a D/A controller to provide an analog output, or further may be provided to any of a number of data acquisition systems, stored in a memory, or the like.

As described earlier, output a 360 and input $p_1$, the current sampled value from the sensor, are provided to the weight adaptation or learning algorithm 380 for the networks where adjustments are made to weights W and bias b. Similarly, output a 365 and input $q_1$ are provided to the weight adaptation or learning algorithm 385 to make weight W and bias b adjustments for the q network.

Figure 5:
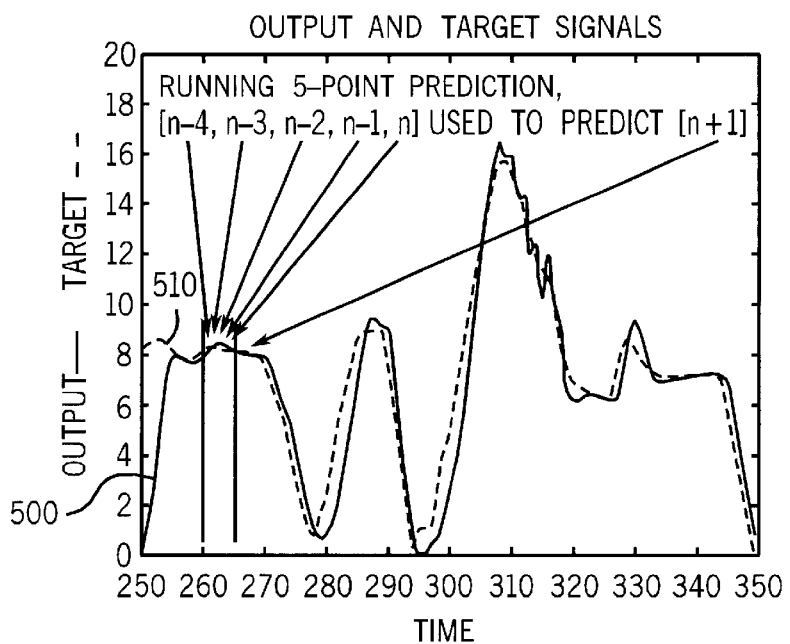
FIG. 5 is an illustration of the actual sensor response versus the predicted sensor response using an exemplary 5-point prediction.

Referring now to FIG. 5, an exemplary graphical representation of the capability of an exemplary system, such as a system utilizing ANN 200, used to predict the sensor output at a time one sampling ahead of the sampled sensor output, is plotted. Line 500 depicts the sampled output using an ANN, such as ANN 200 and line 510 depicts the actual sensor output sampled. It can be seen that there is a time, approximately between time 250 and 255 where line 500 is substantially different than line 510 because the ANN does not have enough sampled historical data points to make an accurate prediction. In an exemplary demonstration, when approximately five time points have been sampled, the ANN is able to make relatively accurate predictions of time steps one time step ahead of the sampled.

The sensor response rate accelerator as described above, in an exemplary embodiment, may be part of a suite of signal conditioning algorithms that are all embedded on a microcontroller (a sensor interface). The microcontroller (sensor interface) may include correcting/conditioning software or hardware for supplying a conditioned signal to an external controller system. The signal conditioning software or hardware may include the described prediction and acceleration algorithms along with, but not limited to, scaling (gain) algorithms, offset adjustments, integration (or smoothing) algorithms, derivative calculation (rate of change), threshold detection, and the like.

It should be noted that a variety of embodiments may be employed without departing from the spirit and scope of the invention, as to the configuration of the ANNs, the interpolation mechanism, the information processing device, and the A/D converter. For example, in one embodiment of the invention the A/D converter may be part of the sensors system and not a part of the computer whereby the computer receives a sampled signal from the A/D converter. Similarly, the ANN may be a program running in the memory of the computer, or, alternatively, the ANN or multiple ANNs may be embodied in dedicated hardware devices, such as dedicated neural processing hardware. Furthermore, the interpolation mechanism may be incorporated into the system as software running on the computer, or as software running on another dedicated device.

While the detailed drawings, specific examples, and particular formulations given describe exemplary embodiments, they serve the purpose of illustration only. The materials and configurations shown and described may differ depending on the chosen performance characteristics and physical characteristics of the sensor prediction systems. For example, the type of neural network or training methodologies used may differ. The systems shown and described are not limited to the precise details and conditions disclosed. Furthermore, other substitutions, modifications, changes, and omissions may be made in the design, operating conditions, and arrangement of the preferred embodiments without departing from the spirit of the invention as expressed in the appended claims.

What is claimed is:

1. A system for improving the response time of a sensor, comprising:

a sensor including an input configured to sense an environmental characteristic and an output configured to provide an electrical signal representative of the input;

a sampling system configured to sample the sensor output at discrete time intervals and provide sampled sensor output signals;

an adaptive filter including a plurality of inputs and at least one output, the plurality of inputs configured to receive sampled sensor output signals, and at least one output of the adaptive filter configured to provide at least one estimated future sensor output based on the plurality of sampled sensor output signals provided to the plurality of inputs to the adaptive filter, the adaptive filter including an artificial neural network, the artificial neural network including a set of weights that are adapted using a learning law;

a processing unit including the adaptive filter; and a program configured to be run by the processing unit, the program configured to provide a plurality of estimated future sensor outputs based on the at least one estimated future sensor output provided by the adaptive filter and based on the plurality of inputs to the adaptive filter, wherein the plurality of estimated future sensor outputs represent sensor outputs at time intervals between the at least one estimated future sensor output and the sampled sensor output signals input to the adaptive filter.

2. The system of claim 1, wherein the processing unit includes the sampling system.

3. The system of claim 1, wherein the adaptive filter is a program configured to be run by the processing unit.

4. The system of claim 1, wherein the adaptive filter is a hardware device of the processing unit, having programmable characteristics.

5. The system of claim 1, wherein the program includes linear interpolation.

6. The system of claim 1, wherein the learning law is a least mean square learning law.

7. The system of claim 1, wherein the artificial neural network is an ADALINE network.

8. The system of claim 1, wherein the artificial neural network is a multi-layer neural network.

9. The system of claim 8, wherein the multi-layer neural network is a back propagation neural network.

10. The system of claim 1, wherein the artificial neural network is a radial basis function network.

11. The system of claim 1, further comprising:
at least two artificial neural networks, each of the artificial neural networks configured to provide an estimated future sensor output representative of different discrete times.

12. The system of claim 1, wherein the adaptive filter includes at least two outputs, each of the outputs configured to provide an estimated future sensor output representative of different discrete times.

13. A method of predicting sensor output, comprising:
adapting weights of a first artificial neural network,
receiving, by the first artificial neural network, a plurality of discrete sensor outputs from p discrete time intervals, up to the time n;
generating an output of the first artificial neural network, based on the sensor outputs from the p discrete time intervals, the output representative of the predicted sensor output at time n+1; and
generating an output of a second artificial neural network, based on the sensor outputs from k discrete time intervals, the k discrete time intervals being offset from the original k discrete time intervals by a time m, where 0<m<1, such that the generated output predicts sensor output for a time n+1+m.

14. The method of claim 13, further comprising:
estimating k sensor outputs between the time n and n+1, based on the sensor output at time n and the estimated sensor output at time n+1.

15. The method of claim 13, wherein the adapting is carried out in an off line training period.

16. The method of claim 13, wherein the adapting is carried out adaptively on line during use.

17. The method of claim 13, wherein the training is based on the optimization of an objective function.

18. A method of accelerating the output of a sensor, comprising:
receiving by a first artificial neural network a plurality of sensor outputs at discrete evenly spaced time intervals less than and including time n;
receiving by a second neural network a plurality of sensor outputs at discrete evenly spaced time intervals less than and including time n+m, where 0<m<1;
generating, by the first neural network, a predicted sensor output that is an estimate of the sensor output at time n+1; and
generating, by the second neural network, a predicted sensor output that is an estimate of the sensor output at time n+1+m.

19. The method of claim 18, further comprising:
updating the weight values of the first neural network based on the actual sensor output at time n and the estimated sensor output at time n; and
updating the weight values of the first neural network based on the actual sensor output at time n+m and the estimated sensor output at time n+m.

20. A method of synthetically accelerating the output response rate of a sensor, comprising:
receiving by an adaptive filter predictor a plurality of sensor outputs at discrete evenly spaced time intervals less than and including time n;
receiving by a second adaptive filter predictor a plurality of sensors outputs at discrete evenly spaced time intervals less than and including time n+m, where 0<m<1;
generating, by the first adaptive filter predictor, a predicted sensor output that is an estimate of the sensor output at time n+1;
generating, by the second adaptive filter predictor, a predicted sensor output that is an estimate of the sensor output at time n+1+m; and
synchronizing the inputs and outputs of the two adaptive filter predictors to provide synthetic sensor output data at a rate faster than the sensor can physically respond.

21. The method of claim 20, wherein the first adaptive filter predictor includes a first neural network and the second adaptive filter predictor includes a second neural network.

* * * * *